United States Patent
Seo (10) Patent No.: US 8,009,540 B2
(45) Date of Patent: Aug. 30, 2011

(54) OPTICAL DISC WRITE CONTROL METHOD AND OPTICAL DISC RECORDING APPARATUS THEREFOR

(75) Inventor: Jin-gyo Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1314 days.

(21) Appl. No.: 11/024,687

(22) Filed: Dec. 30, 2004

(65) Prior Publication Data

US 2005/0147015 A1 Jul. 7, 2005

(30) Foreign Application Priority Data

Jan. 6, 2004 (JP) .................. 10-2004-0000561

(51) Int. Cl.
*G11B 7/00* (2006.01)
(52) U.S. Cl. ............... 369/59.11; 369/116; 369/47.53; 369/47.5
(58) Field of Classification Search .................. None
See application file for complete search history.

(56) References Cited

U.S. PATENT DOCUMENTS

| 2003/0036861 A1* | 2/2003 | Matsumoto ............. 702/60 |
| 2003/0151994 A1* | 8/2003 | Tasaka et al. ........... 369/47.53 |

FOREIGN PATENT DOCUMENTS

| JP | 08-124161 | 5/1996 |
| JP | 09-167347 | 6/1997 |
| JP | 11-102522 | 4/1999 |
| JP | 2001-014676 | 1/2001 |

* cited by examiner

*Primary Examiner* — Muhammad N Edun
(74) *Attorney, Agent, or Firm* — Staas & Halsey LLP (57) ABSTRACT

A write control method which varies a write power in response to a recording speed, a recording density, and a type of recording medium, and an optical disc recording apparatus suitable for the write control method. The write control method includes preparing a plurality of standard power values corresponding to recording speeds or recording densities for a plurality of record marks, selecting one of the plurality of standard power values with respect to a record mark to be recorded according to a recording speed or a recording density, and controlling write power of a laser beam according to the selected standard power value. The write control method and apparatus improve recording performance of an optical disc recording apparatus by differently setting write power values according to recording speeds, recording densities, and types of recording media.

12 Claims, 5 Drawing Sheets

OPTICAL DISC WRITE CONTROL METHOD AND OPTICAL DISC RECORDING APPARATUS THEREFOR

CROSS-REFERENCE TO RELATED APPLICATIONS

This application claims the benefit of Korean Patent Application No. 2004-561, filed on Jan. 6, 2004, in the Korean Intellectual Property Office, the disclosure of which is incorporated herein by reference.

BACKGROUND OF THE INVENTION

1. Field of the Invention

The present invention relates to an optical disc recording method and apparatus, and more particularly, to a write control method, which varies write power in response to a recording speed, a recording density, and a type of recording medium, and an optical disc recording apparatus suitable for the write control method.

2. Description of the Related Art

Recording media with high capacity are necessary in the multimedia age, and optical recording apparatuses using the recording media with high capacity include a magnetic optical disc drive (MODD), a compact disc (CD) recording apparatus, a CD Rom/ReadWrite (CD-R/RW) recording apparatus, a digital versatile disc (DVD) recording apparatus, and a DVD Random Access Memory/ReadWrite (DVD-RAM/RW) recording apparatus.

In these optical recording apparatuses, since the available time for forming a record mark with the same length decreases as a recording speed increases, an increasingly more precise write control is required corresponding to the increase of the recording speed.

In general, in an optical disc, a signal is recorded by heating a recording layer with a laser beam or by cooling the recording layer with natural cooling. A crystalline state of the recording layer is affected by a heating temperature and a cooling speed, and crystalline and amorphous states of this recording layer correspond to values (0 and 1) of a binary signal, respectively.

The heating temperature for the recording layer is influenced by write control including the write power and a heating period of the laser beam. That is, a record mark with a desired length can be formed by radiating a laser beam with a predetermined write power on the recording layer for a predetermined heating period.

However, when the record marks with identical lengths are formed, if the recording speed is changed, that is, if the heating period is changed, the amount of heat accumulated in the recording layer changes. Accordingly, inequality of the recording, and more particularly, jitter is generated where starting and ending positions of the record marks drift. This inequality of the recording is also generated when a recording density is changed, that is, when lengths of the record marks with the same pattern (for example, 3T, 4T, etc) changed.

Accordingly, an improved write control method which varies write control so that heat accumulation on the recording layer can be accurately performed in response to a change of the recording speed and the recording density is required.

SUMMARY OF THE INVENTION

Accordingly, it is an aspect of the present invention to provide a write control method of improving recording quality by minimizing the inequality of the recording resulting from a change of a recording speed and a recording density in an optical disc recording apparatus, and an optical disc recording apparatus suitable for the write control method.

Additional aspects and/or advantages of the invention will be set forth in part in the description which follows and, in part, will be obvious from the description, or may be learned by practice of the invention.

The foregoing and/or other aspects of the present invention are achieved by providing a write control method of an optical disc recording apparatus to compare power of an optical signal output from a laser diode with a standard power value and to control power of the laser diode according to the comparison results, the method includes preparing a plurality of standard power values corresponding to recording speeds or recording densities for a plurality of record marks, selecting one of the plurality of standard power values with respect to one of the plurality of record marks to be generated according to a recording speed or a recording density, and controlling write power of a laser beam according to the selected standard power value.

According to an aspect of the invention, the record marks may be classified into a plurality of groups according to lengths, and a plurality of standard power values corresponding to the respective groups are prepared.

According to an aspect of the invention, the plurality of standard power values for the record marks may be differently set according to types of recording media as well as recording speeds or recording densities.

Another aspect of the present invention is achieved by providing an optical disc recording apparatus to compare power of an optical signal output from a laser diode with a standard power value and to control power of the laser diode according to the comparison results, the apparatus including a data determination unit determining a length of a record mark to be recorded, a write pulse generator generating a write pulse corresponding to the determined record mark to be recorded, a laser diode driver driving the laser diode according to the write pulse output from the write pulse generator, a photo diode detecting an amount of an optical signal output from the laser diode, a comparator comparing an output of the photo diode and the standard power value, a calculator controlling output power of the laser diode according to the comparison results of the comparator, and a controller transferring the standard power value to the comparator.

According to an aspect of the invention, the controller may include a plurality of standard power values corresponding to recording speeds or recording densities for each of the record marks, selecting one of the plurality of standard power values with respect to a record mark to be recorded according to a recording speed or a recording density, and transferring the selected standard power value to the comparator.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
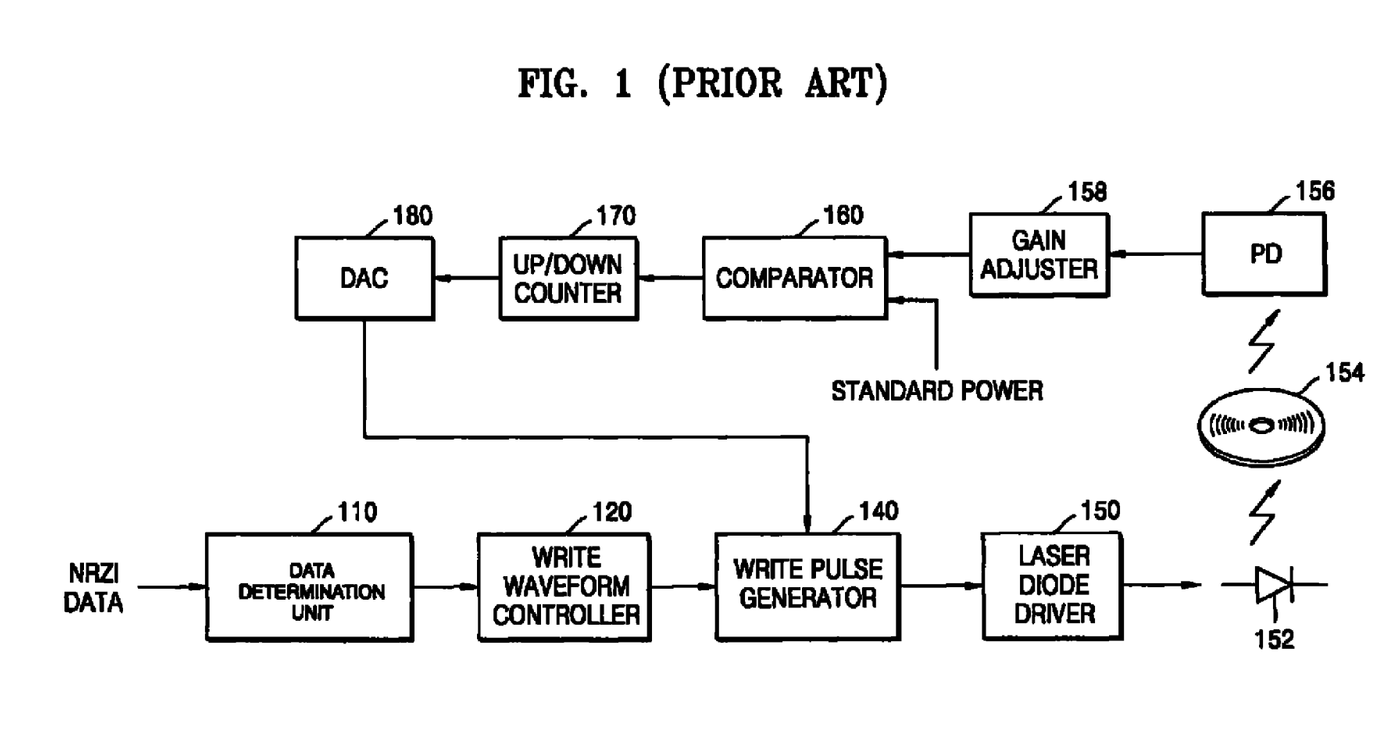
FIG. 1 is a block diagram of a conventional optical disc recording apparatus.

FIG. 1 is a block diagram of a conventional optical disc recording apparatus.

Referring to FIG. 1, a data determination unit 110 determines a number of Ts (T is an inverse number of a channel clock) each mark or space corresponds to with reference to input nonreturn to zero inverted (NRZI) data. A write waveform controller 120 generates control signals according to a record mark to be recorded based on a determination result of the data determination unit 110. The control signals include a read control signal, a peak control signal and a bias control signal.

A write pulse generator 140 generates a write pulse according to the control signals provided by the write waveform controller 120, and a laser diode driver 150 drives a laser diode 152 according to the write pulse provided by the write pulse generator 140.

A gain adjuster 158 adjusts a gain of an optical detection signal input via a photo diode 156 according to an operational mode of the optical disc recording apparatus (i.e. whether or not to record/reproduce). A comparator 160 compares a power value of the optical detection signal output from the gain adjuster 158 and standard power values, an up/down counter 170 counts up/down according to the comparison result of the comparator 160, and a digital-to-analog converter (DAC) 180 converts an up/down count value into an analog signal and transmits the analog signal to the write pulse generator 140.

The standard power values transferred to the comparator 160 include a standard read power value, a standard peak power value and a standard bias power value. The respective standard power values are compared to voltages of the optical detection signal output from the gain adjuster 158 sampled in a read power period, a peak power period, and a bias power period, and according to the comparison results, a read power value, a peak power value and a bias power value transferred to the write pulse generator 140 are changed.

Figure 2:
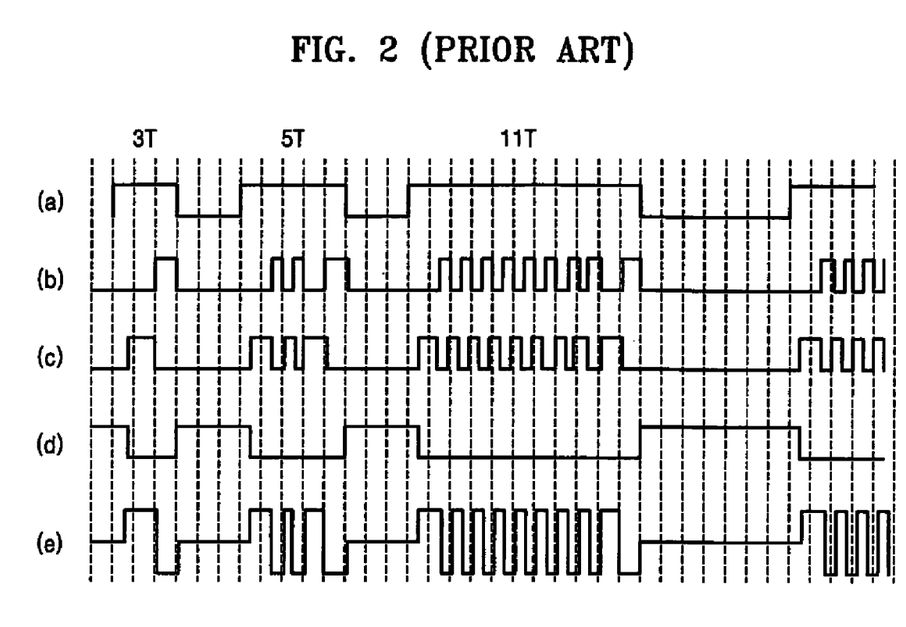
FIG. 2 shows waveform diagrams illustrating operations of the apparatus as shown in FIG. 1.

In FIG. 2 waveforms (a) through (e) illustrate operations of the apparatus shown in FIG. 1.

Referring to FIG. 2, a write pulse shown in waveform (e) is generated in response to input NRZI data composed of 3T, 5T and 11T shown in waveform (a). Here, a value of the NRZI data corresponds to a mark or a space formed on an optical disc. That is, a duration in which an NRZI signal maintains "1" corresponds to an area in which a record mark is formed, that is a mark, and a duration in which an NRZI signal maintains "0" corresponds to an area in which a content recorded on the optical disc is deleted, that is, a space.

In a multi pulse recording method for DVD recording, a write pulse to form a record mark includes a plurality of pulses, which usually include a first pulse, a multi pulse, a last pulse, and a cooling pulse. The first pulse forms a rising edge of the record mark, the multi pulse forms a body between the rising edge and a falling edge of the record mark, the last pulse forms a falling edge of the record mark, and the cooling pulse forms a trailing part next to the falling edge of the record mark.

When record marks having different lengths are formed, only the number of the multi pulses is changed without the first pulse, the last pulse, or the cooling pulse being changed.

The write pulse shown in waveform (e) is formed by adding a read power value controlled by a read power control signal as shown in waveform (b), a peak power value controlled by a peak power control signal as shown in waveform (c), and a bias power value controlled by one through three control signals as shown in waveform (d).

That is, the write pulse has the read power value (or a cooling power value) in a period in which the read power control signal is active, the write pulse has the peak power value in a period in which the peak power control signal is active, and the write pulse has the bias power value (or an erase power value) in a period in which the bias power control signal is active.

According to a 2.6 GB DVD-RAM standard recommendation, a waveform of a write pulse is composed of a first pulse, a multi pulse chain, and a last pulse. A rising edge of the first pulse of a basic write pulse is delayed T/2 from a rising edge of a record mark. The rising edge of the first pulse can be shifted back and forth in units of 1 ns (nano second), and the last pulse can also be shifted back and forth in units of 1 ns. The multi pulse includes a plurality of short pulses to thereby reduce the heat accumulation of the record mark so as not to change the record mark.

Referring to the waveforms shown in FIG. 2, when a recording speed or a recording density is changed, T is changed. Accordingly, a formation time of a record mark is changed. The formation time of the record mark is inversely proportional to the recording speed and the recording density. Since the formation time of the record mark, and more particularly, a heating time is reduced, it is difficult to generate sufficient heating to melt a recording layer. Accordingly, inequality of recording, and in particular jitter, increases.

To overcome this problem, in a write control method according to an embodiment of the present invention, power of a laser beam, in particular, the peak power is controlled according to the recording speed or the recording density. For example, when a record mark is recorded, if the recording speed increases, the recording layer is heated efficiently to compensate for the reduced heating time by increasing the peak power.

Figure 3:
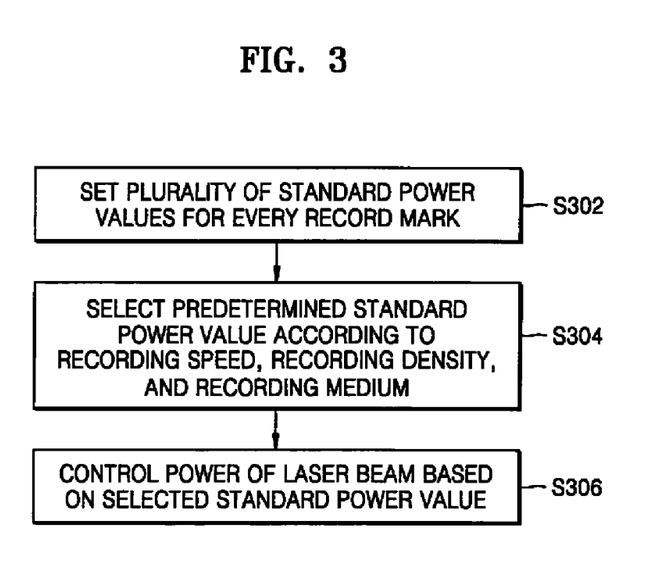
FIG. 3 is a flowchart of a write control method according to an embodiment of the present invention.

FIG. 3 is a flowchart of a write control method according to an embodiment of the present invention.

In operation S302, a plurality of standard power values corresponding to recording speeds or recording densities are set for every record mark.

From operation S302, the process moves to operation S304 where one of the plurality of standard power values is selected for a record mark to be recorded in accordance with a recording speed or a recording density.

From operation S304, the process moves to operation S306 where power of an optical signal output from a laser diode is controlled in accordance with the selected standard power value.

In a conventional write control method which uses the same standard power value regardless of recording speeds or recording densities, when the recording speed is faster, a record mark may be formed smaller or abnormal due to lack of preheating or an optical power value in a case of 3T. On the contrary, in a case of 11T, a record mark can be formed larger due to heat accumulation or a cross erase can be caused by affecting a neighboring track.

As described above, only the size of the record mark can affect the recording quality. However, correlations between marks and spaces may have a larger effect on the recording quality. For example, when a mark of 3T is recorded next to a space of 11T, a lack of preheating can occur when the mark of 3T is recorded due to overcooling of a recording layer during a zone of the space of 11T. Also, when a mark of 11T is recorded next to a space of 3T, overheating can occur by accumulating heat while the mark of 11T is performed in a state whereby some heat remains because a recording layer could not be sufficiently cool while the space of 3T is performed.

The size of a record mark is uneven due to this lack of preheating or overheating, and this causes the jitter (i.e., fluctuations in time). Accordingly, the recording performance of an optical recording apparatus becomes deteriorated.

In the embodiment of the present invention, by allowing record marks to be formed with a predetermined write power value according to recording speeds or recording densities, inequality of the sizes of the record marks due to the lack of preheating or the overheating can be minimized. Accordingly, recording performance of an optical recording apparatus can be improved by minimizing the jitter.

Considering combinations of marks and spaces, since the lengths of the marks or the spaces include 10 length types, including 3T, 4T, 5T, 6T, 7T, 8T, 9T, 10T, 11T, and 14T in a DVD, a total of 200 combinations (100 combinations between previous spaces and current marks and 100 combinations between the current marks and subsequent spaces) exist.

Also, considering the realization of a multiplexer for selecting one of a plurality of standard power values set for the combinations, corresponding necessary hardware becomes too large. Accordingly, a calculation is imbalanced against costs, including consumption of power.

To overcome this problem, the marks and the spaces are divided into a plurality of groups, and combinations are performed based on the groups. Accordingly, the number of combinations is reduced, and performance can be improved while the size of hardware is optimized.

Figure 4:
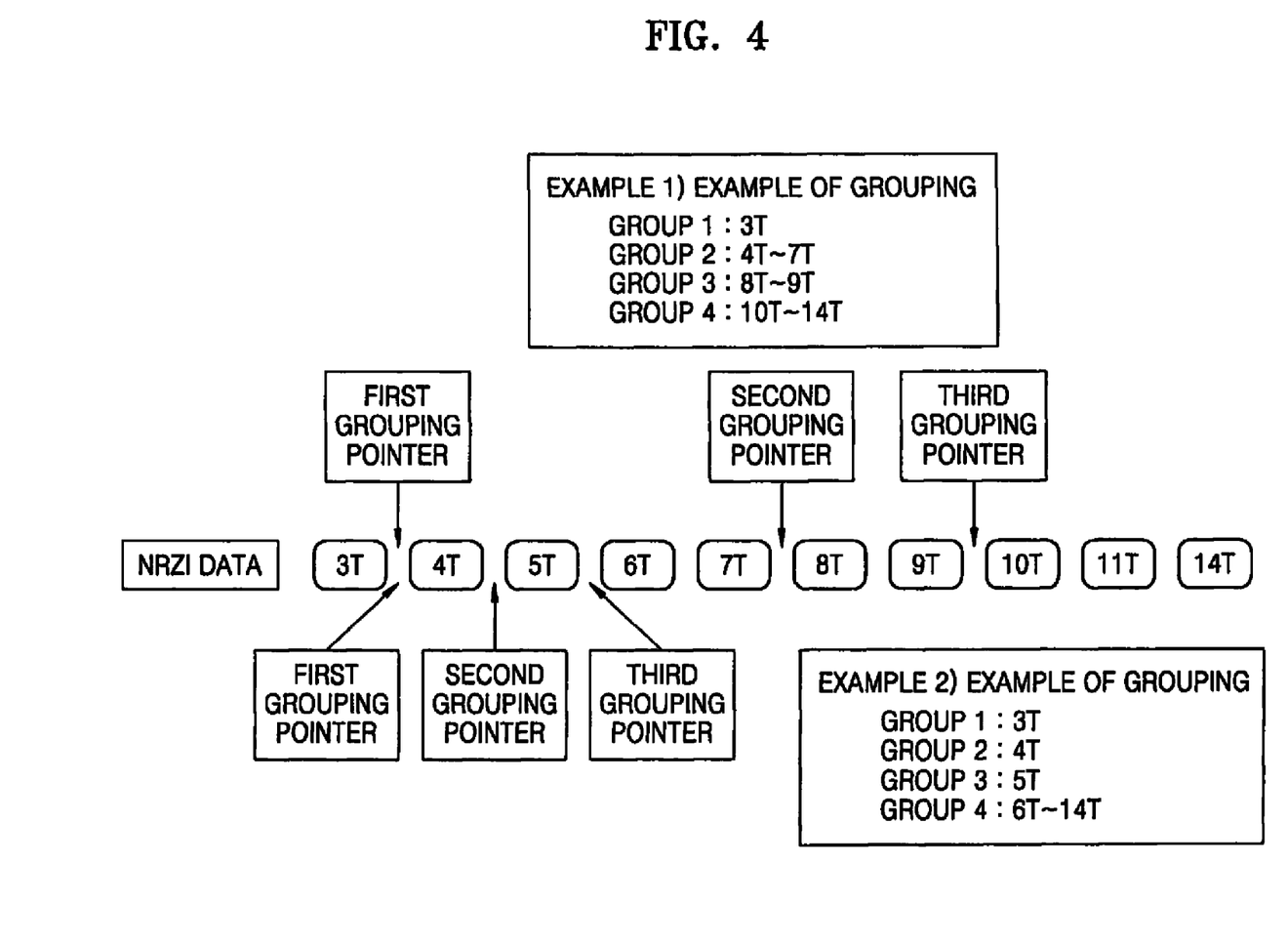
FIG. 4 illustrates two grouping examples in a write control method according to an embodiment of the present invention.

FIG. 4 illustrates two grouping examples in a write control method according to an embodiment of the present invention. In a first example shown in the upper part of FIG. 4, 4 groups, such as a group 1 including 3T, a group 2 including 4T through 7T, a group 3 including 8T and 9T, and a group 4 including 10T through 14T, are shown. In a second example shown in the lower part of FIG. 4, 4 groups, such as a group 1 including 3T, a group 2 including 4T, a group 3 including 5T, and a group 4 including 6T through 14T, are shown.

Division into each group is performed by first through third grouping pointers, and values of the grouping pointers are differently set according to types of recording media used.

That is, in the present embodiment, a standard power value is set to one of 4 values corresponding to the 4 groups, and the group and the standard power value are selected according to a recording speed, a recording density, and the recording medium used.

Also, the values of the grouping pointers are changed according to recording speeds, recording densities, and the recording media used.

Changing the values of the grouping pointers according to the recording speeds, the recording densities, and the recording media used can be performed by software, and selecting one of 4 standard power values can be performed by simple hardware. Accordingly, the size of the hardware for a write control can be optimized.

Figure 5:
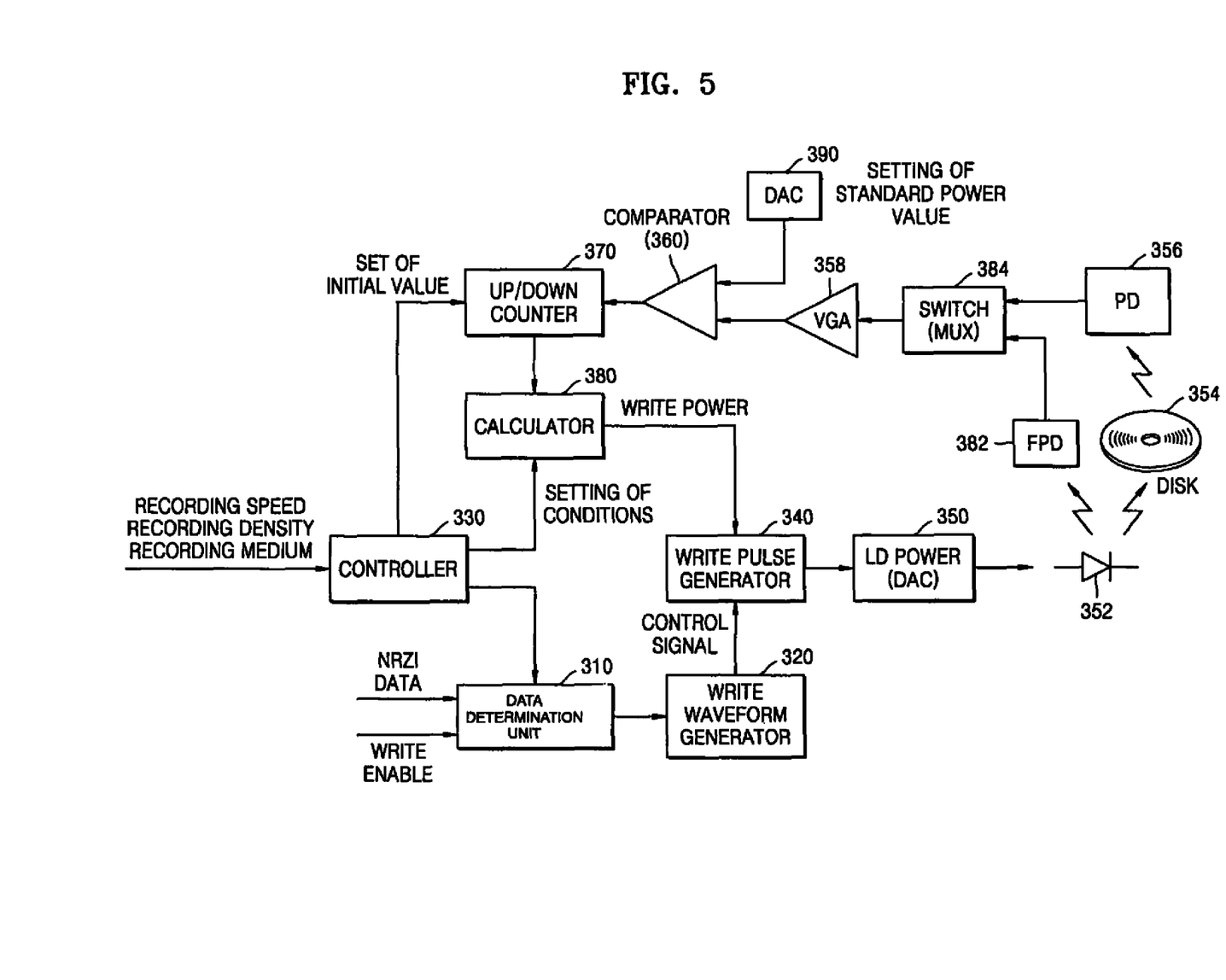
FIG. 5 is a block diagram of an optical disc recording apparatus according to another embodiment of the present invention.

FIG. 5 is a block diagram of an optical disc recording apparatus according to an embodiment of the present invention.

Referring to FIG. 5, the optical disc recording apparatus includes a data determination unit 310, a write waveform generator 320, a controller 330, a write pulse generator 340, a laser diode driver 350, a laser diode 352, a disc 354, a photo diode 356, a gain adjuster 358, a comparator 360, an up/down counter 370, a calculator 380, and a DAC 390.

Here, the laser diode driver 350, the laser diode 352, the photo diode 356, the gain adjuster 358, the comparator 360, the up/down counter 370, the calculator 380, and the DAC 390 perform an auto laser-diode power control (ALPC) operation related to an optical signal reflected from the disc 354.

When a write enable signal that indicates a start of recording and an NRZI data are input, the data determination unit 310 determines how many Ts corresponding to each mark and space correspond to.

The determination of the data determination unit 310 are provided to the write waveform generator 320, and the write waveform generator 320 generates control signals suitable for recording media and recording speeds.

The controller 330 takes charge of initialization and control of the respective blocks shown in FIG. 5, and more particularly, sets an initial value of the up/down counter 370 and standard power values set in the DAC 390. The initial value is a counting value corresponding to a standard power value based on a recording speed and a recording density.

Outputs of the up/down counter 370 are input to the calculator 380. The calculator 380 passes the outputs of the up/down counter 370 to the write pulse generator 340, outputs an average of the outputs of the up/down counter 370 during a predetermined time, or filters the outputs of the up/down counter 370, and outputs values corresponding to write power values to the write pulse generator 340. The write pulse generator 340, which may include a multiplexer, selects one of the write power values output from the calculator 380 according to a control signal generated by the write waveform generator 320, and outputs the selected write power value to the laser diode driver 350.

The laser diode driver 350 outputs a current value corresponding to the write power value of the write pulse input to the laser diode 352. The laser diode 352 outputs a laser beam having an optical power value corresponding to the amount of the current output from the laser diode driver 350.

A part of the laser beam of the laser diode 352 is directly irradiated to a front photo diode 382 and used to maintain a constant optical power value by generating a closed-loop for auto power control (APC).

Most other parts of the laser beam are irradiated to the disc 354 through an objective lens (not shown). The laser beam reflected from the disc 354 is input to the photo diode 356, signal-processed, and used for recording/reproducing.

A switch 384 can select an output of the front photo diode 382 or an output of the photo diode 356, and the output of the switch 384 is input to the gain adjuster 358. The gain adjuster 358 is realized using a variable gain amp (VGA).

An output of the DAC 390 is input to the comparator 360 as a standard power value corresponding to a recording speed and a recording density, and an output of the gain adjuster 358 is also input to the comparator 360. The comparator 360 compares the two input values to each other, and according to the comparison result, a counting direction of the up/down counter 370 is set.

For example, an operation of the apparatus shown in FIG. 5 will now be described.

When an output of the laser diode 352 is controlled using the closed-loop for the APC, if a set power value of the front photo diode 382 or the photo diode 356 is smaller than a standard power value set by the DAC 390 due to a reason (for example, an output change of the laser diode 352 according to a temperature change), the comparator 360 increases a counting value of the up/down counter 370 by outputting a low value. At this time, an initial value corresponding to the standard power value is set in the up/down counter 370, and a value corresponding to the standard power value is set in the DAC 390.

When the counting value of the up/down counter 370 increases, since an output of the up/down counter 370 is provided to the write pulse generator 340 via the calculator 380, an input current of the laser diode 352 increases. Accordingly, a constant amount of a laser beam is maintained.

On the contrary, if a power value output from the front photo diode 382 or the photo diode 356 is larger than a standard power value output from the DAC 390, the comparator 360 decreases a counting value of the up/down counter 370 by outputting a high value. If the counting value of the up/down counter 370 decreases, since the input current of the laser diode 352 decreases, a constant amount of the laser beam is maintained.

Here, an operational clock of the up/down counter 370 can be variably set in consideration with an operation time of the APC closed-loop.

The controller 330 includes a table storing standard power values corresponding to groups as described with reference to FIG. 4. The controller 330 reads a standard power value corresponding to a recording speed, a recording density, and a recording medium from the table and sets an initial value of the up/down counter 370 and a standard power value of the DAC 390.

Figure 6:
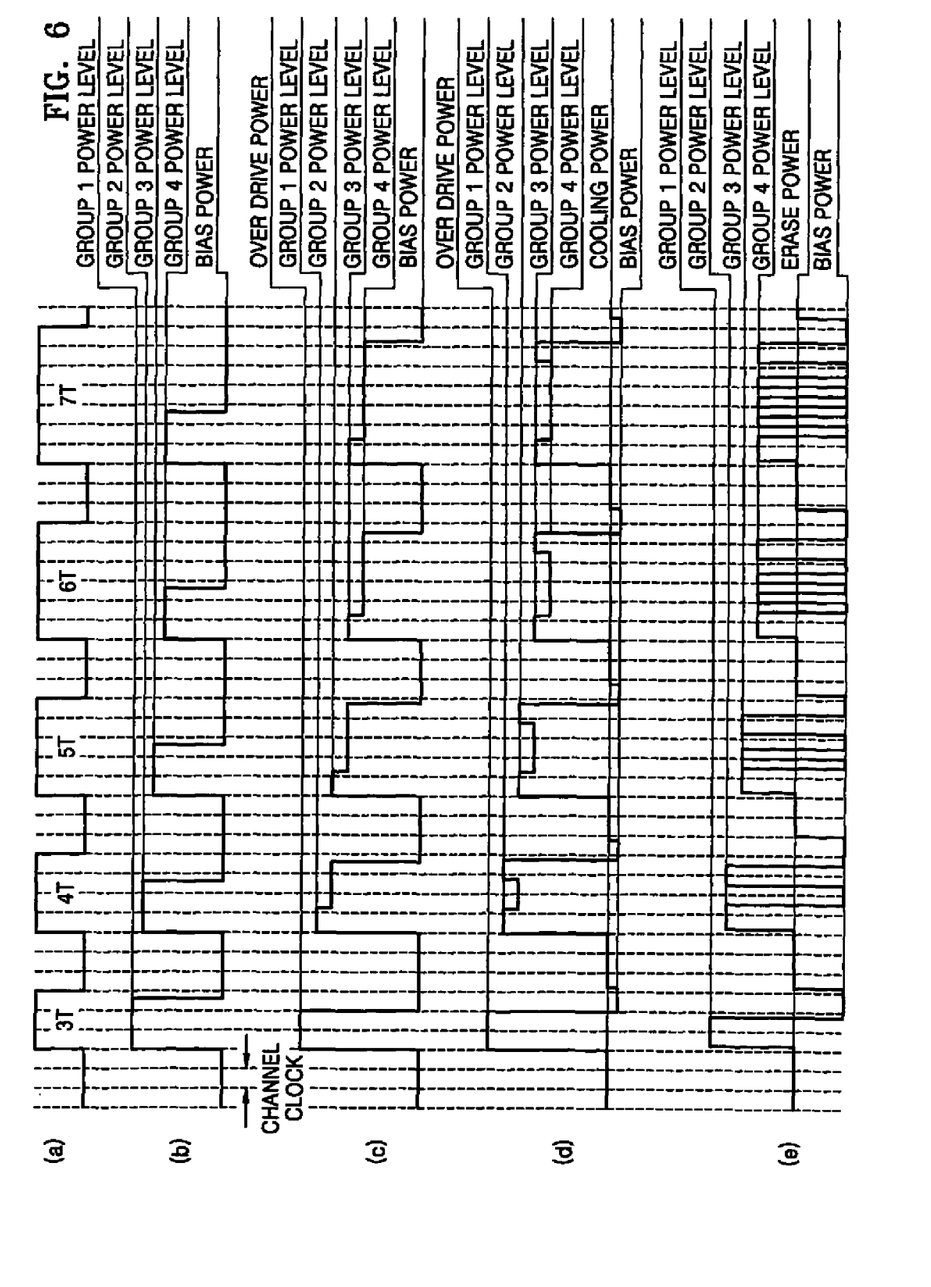
FIG. 6 shows waveform diagrams illustrating examples of write pulses according to a write control method according to an embodiment of the present invention.

In FIG. 6, waveforms (a) through (e) illustrate examples of write pulses according to a write control method according to an embodiment of the present invention. Waveform (a) shows input NRZI data, waveform (b) shows an example of a write waveform of a CD-R type recording medium, waveform (c) shows an example of a write waveform of a CD-R type recording medium having over drive power, waveform (d) shows an example of a write waveform of a DVD type recording medium, and waveform (e) shows an example of a write waveform of a DVD-RAM or DVD-RW type recording medium.

The examples shown in waveforms (a) through (e) correspond to the second grouping example shown in the lower part of FIG. 4. Also, the overdrive power is conducted to strengthen rising edges and falling edges of recording marks.

As described above, a write control method and apparatus according to an embodiment of the present invention improve the recording performance of an optical disc recording apparatus by differently setting write power values according to recording speeds, recording densities, and types of recording media.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A write control method of an optical disc recording apparatus to compare power of an optical signal output from a laser diode with a standard power value and to control power of the laser diode according to the comparison results, the method comprising:
   preparing a plurality of standard power values corresponding to combinations of lengths of marks and spaces;
   selecting one of the plurality of standard power values according to a determined combination of lengths of marks and spaces; and
   controlling write power of a laser beam according to the selected standard power value.

2. The method of claim 1, wherein the marks and the spaces are classified into a plurality of groups according to lengths, and a plurality of standard power values corresponding to the respective groups are prepared.

3. An optical disc recording apparatus to compare power of an optical signal output from a laser diode with a standard power value and to control a power of the laser diode according to the comparison results, the apparatus comprising:
   a data determination unit determining a length of a record mark to be recorded;
   a write pulse generator generating a write pulse corresponding to the record mark to be recorded according to determination results of the data determination unit;
   a laser diode driver driving the laser diode according to the write pulse output from the write pulse generator;
   a photo diode detecting an amount of an optical signal output from the laser diode;
   a comparator comparing an output of the photo diode and the standard power value;
   a calculator controlling output power of the laser diode according to comparison results of the comparator; and
   a controller transferring the standard power value to the comparator,
   wherein the controller comprises a plurality of standard power values corresponding to combinations of lengths of marks and spaces, selects one of the plurality of standard power values according to a determined combination of lengths of marks and spaces, and transfers the selected standard power value to the comparator as the standard power value.

4. The optical disc recording apparatus of claim 3, further comprising:
   a write waveform generator generating control signals suitable for the record mark to be recorded based upon the determination results of the data determination unit.

5. The optical disc recording apparatus of claim 3, further comprising:
   a counter counting up/down according to the comparison results of the comparator; and
   a digital-to-analog converter which converts a count value of the counter into an analog signal and transmits the analog signal to the write pulse generator.

6. The optical disc recording apparatus of claim 5, wherein the controller sets an initial value of the counter as a counting value which corresponds to the one of the plurality of standard power values, based on a determined combination of lengths of marks and spaces.

7. The optical disc recording apparatus of claim 6, wherein the controller includes a table storing the standard power values and reads the one of the standard power values corresponding to combinations of lengths of marks and spaces from the table and sets an initial value of the counter and the standard power value of the digital-to analog converter.

8. The optical disc recording apparatus of claim 5, wherein an output of the digital-to-analog converter is input to the comparator as the standard power value corresponding to combinations of lengths of marks and spaces.

9. The optical disc recording apparatus of claim 5, wherein when the counting value of the counter increases, and an output of the counter is provided to the write pulse generator via the calculator, an input current of the laser diode increases, and a constant amount of a laser beam is maintained.

10. The optical disc recording apparatus of claim 3, wherein the laser diode driver outputs a current value corresponding to a write power value of the write pulse input and the laser diode outputs a laser beam having an output power value corresponding to the current value.

11. A method for controlling write power in an optical disc recording apparatus, the method comprising:
 selecting a standard power value of a plurality of standard power values with respect to a record mark for a medium to be recorded according to a determined combination of lengths of marks and spaces; and
 controlling write power of a laser beam according to the selected standard power value.

12. A recording apparatus comprising:
 a data determination unit determining a length of a record mark to be recorded;
 a write pulse generator generating a write pulse corresponding to the record mark to be recorded according to the determination;
 a laser diode driver driving a laser diode according to the write pulse;
 a photo diode detecting an amount of an optical signal output from the laser diode;
 a comparator comparing an output of the photo diode and a standard power value; and
 a controller transferring the standard power value to the comparator,
  wherein the controller comprises a plurality of standard power values corresponding to combinations of lengths of marks and spaces and selects one of the plurality of standard power values as the standard power value to be transferred to the comparator.

* * * * *

UNITED STATES PATENT AND TRADEMARK OFFICE
CERTIFICATE OF CORRECTION

PATENT NO.         : 8,009,540 B2                                    Page 1 of 1
APPLICATION NO.    : 11/024687
DATED              : August 30, 2011
INVENTOR(S)        : Jin-gyo Seo It is certified that error appears in the above-identified patent and that said Letters Patent is hereby corrected as shown below:

Column 8, Line 67, In Claim 7, delete "digital-to analog" and insert -- digital-to-analog --, therefor.

Signed and Sealed this
Fourteenth Day of February, 2012

David J. Kappos
*Director of the United States Patent and Trademark Office*